T. A. Davies,
Jaw Trap,
Nº 6,495. Patented June 5, 1849.
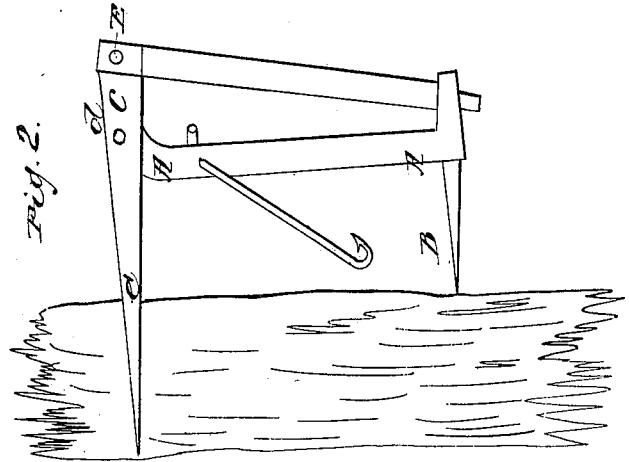
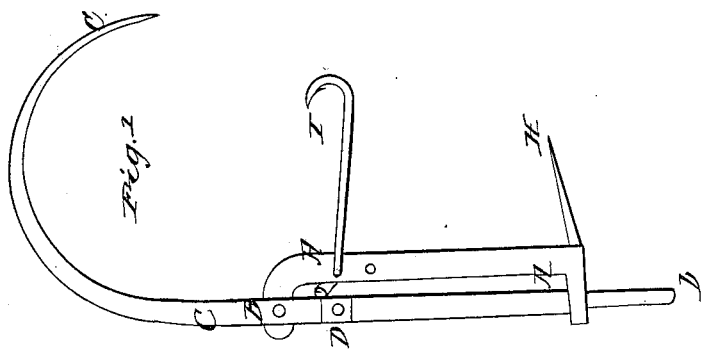
Witnesses
Inventor

UNITED STATES PATENT OFFICE.

THO. A. DAVIES, OF NEW YORK, N. Y.

IMPROVED TRAP AND METHOD OF SETTING IT.

Specification forming part of Letters Patent No. 6,495, dated June 5, 1849.

*To all whom it may concern:*

Be it known that I, THOMAS A. DAVIES, of the city, county, and State of New York, have invented a new and useful Mode of Making Fish-Hooks and Animal-Traps; and I hereby declare the following to be a description of the same.

Figure 1: A A is the shaft upon which is attached at B the hook C C, by means of a pivot, upon which it revolves. D D is a wire or casting with a head, and passes through a hole at one end of the shaft A A, and is attached to the end of the hook at C C the point $f$ by a rivet to make a joint. Between the head D D and the end of the shaft A A, where the wire passes through the hole, is a spiral spring of any convenient metal, or spring of any kind most convenient to attach. H is a sharp point of wire inserted into the end of the casting A A, to meet or nearly meet the end of the hook C C when sprung. I is a common fish-hook, which holds the bait, the blunt end of which passes through a hole in the casting A A, and turns back and between it and the end of the large hook C C when opened, and is so arranged that when the baited end of the hook I is moved the other end, acting as a lever upon the joint made by the end of the large hook and the head of the wire, throws that joint outward, and, the balance of centers being lost, the point of the large hook and the sharp point in the end of the shaft A A are forced together by the spring at the back. The end of the large hook, passing near the end of the hook holding the bait, will pierce whatever may have moved the end of the small hook, and hold it firmly between the two sharp points. The hook is intended to act in any way in which it may be placed; but will in all probability act best in a horizontal position, as in that way you will be most likely to spring the hook upon the fish in one given position. A fish mostly approaches the bait in a horizontal position, and a horizontal stroke would be most likely to hit him. To accomplish this end, a hole is put in the shaft A A as near the center of gravity as can be, and the fishing-line passed through it in a vertical direction. The fish then approaches the bait, which is upon the end of the small hook, and the least touch springs it and his head or nose, which is between the two points, must be perforated instantly. The two points might be barbed, or one of them, but there is probably no occasion for that, as the second small point prevents the fish from escaping, and it is quite easy removing them from the hook, as you have but to open it and the fish falls out without touching the fish with the hands. The same result in general could be obtained by setting the hook nearly on centers and introducing a catch or lock at the back or on the end of the small baited hook, but these are deemed inconvenient.

Fig. 2: A A is the shaft, at the one end of which is the sharp point B. C C is a sharp nail, which is attached at $d$ to the shaft A A, and at E to the head of the wire which holds the spiral or other spring, as before described. The hook or bait-holder is arranged in the same way.

To set the trap, drive the nail into wood—say to within three-fourths of an inch of the shaft A A—and then set the trap by opening till the three points come near or quite in a right line, and the joint resting up in the end of the wire hook used for a bait-hook. The least touch at the bait-hook will spring the trap, and the sharp point B penetrate the head of the intruder.

What I claim as my invention, and desire to secure by Letters Patent, is—

The combination of the hook, the straight bar to which it is attached by a pivot, and the spring, the whole arranged and acting substantially as herein described, by which I am enabled to set the trap without a catch or lock of any kind.

THOS. A. DAVIES.

Witnesses:
R. BLAKESLEE, Jr.,
JAMES S. PHELPS, Jr.